United States Patent [19]
Berlad

[11] Patent Number: 6,056,397
[45] Date of Patent: May 2, 2000

[54] METHOD AND APPARATUS FOR REDUCING GLARE WHILE DRIVING

[75] Inventor: Abraham L. Berlad, Rancho Santa Fe, Calif.

[73] Assignee: The Research Foundation of State University of New York, Albany, N.Y.

[21] Appl. No.: 09/166,882

[22] Filed: Oct. 6, 1998

[51] Int. Cl.$^7$ .................................................. G02C 7/10
[52] U.S. Cl. .......................... 351/44; 351/45; 351/49; 351/158
[58] Field of Search .................... 351/41, 47, 44, 351/45, 57, 158, 49; 359/483, 493

[56] References Cited

U.S. PATENT DOCUMENTS

| | | | |
|---|---|---|---|
| 950,255 | 2/1910 | Alles | 351/47 |
| 1,577,527 | 3/1926 | Hoyt et al. | 296/96.19 |
| 1,584,041 | 5/1926 | Shaver | 351/47 |
| 1,706,429 | 3/1929 | Willard | 351/45 |
| 2,005,426 | 6/1935 | Land | 351/47 |
| 2,087,795 | 7/1937 | Chubb | 351/46 |
| 2,146,544 | 2/1939 | Kleine | 2/13 |
| 2,237,565 | 4/1941 | Land | 351/49 |
| 2,301,126 | 11/1942 | Kriebel | 351/47 |
| 2,334,446 | 11/1943 | Serrell | 351/43 |
| 2,475,921 | 7/1949 | Smith | 359/493 |
| 2,773,422 | 12/1956 | Flynn et al. | 351/47 |
| 3,026,763 | 3/1962 | Marks | 359/493 |
| 3,664,733 | 5/1972 | Kalkowski | 351/45 |
| 4,698,022 | 10/1987 | Gilson | 351/57 |
| 5,252,997 | 10/1993 | Christenbery | 351/59 |
| 5,372,504 | 12/1994 | Buechler | 434/35 |

FOREIGN PATENT DOCUMENTS

| | | | |
|---|---|---|---|
| 818081 | 7/1949 | Germany | 351/45 |
| 309675 | 7/1933 | Italy | 351/45 |

OTHER PUBLICATIONS

Author: John V. Forrester, et al; Title: "The Eye" pp. 199, 202–207, 220–223, and 236; Date of Publication: 1996: Place of Publication: United States.

*Primary Examiner*—Huy Mai
*Attorney, Agent, or Firm*—Hoffmann & Baron, LLP

[57] ABSTRACT

A method and apparatus for reducing glare created by oncoming headlights or the sun at either dusk or dawn is disclosed. The method uses a light filter to reduce the intensity of light encountered by a driver from oncoming headlights in a region. The region is defined by the driver's side portion of the windshield and a separatrix. The separatrix includes a horizontal segment, a vertical segment, and a perspective segment. The horizontal segment is located between the driver's side portion and the passenger's side portion of the perimeter of the windshield. The horizontal segment has first and second ends such that the second end is adjacent to the driver's side portion and the first end is adjacent to the passenger's side portion. The vertical segment begins at a central position on the upper portion of the windshield and ends at the first end of the horizontal segment. The perspective segment begins at the second end of the horizontal segment and extends downward at an obtuse angle towards the driver's side portion of the windshield ending at the lower portion of the windshield. The perspective segment accounts for the approach pattern of automobiles and terminates at the horizontal segment which is preferably substantially parallel with the horizon. The light filter uses either tinted elements, polarized elements, or a combination of both tinted and polarized elements for reducing the intensity of the light. Various embodiments of the apparatus disclosed herein include eyeglasses, clip-on eyeware, windshields, visors, and a combination of either eyeglasses or clip-on eyeware to be combined with either a windshield or visor.

19 Claims, 5 Drawing Sheets

METHOD AND APPARATUS FOR REDUCING GLARE WHILE DRIVING

BACKGROUND OF THE INVENTION

The present invention relates generally to a method and apparatus for reducing glare. The present invention is primarily directed to a glare reduction device for aiding a driver of an automobile when encountering a glare producing light source in the horizon such as oncoming headlights or the sun at either dusk or dawn.

Glare producing light sources reduce the visual acuity of observers. That is, the glare reduces the observers' ability to see and understand visual information which is characterized by a loss of sensitivity and increased response time of the retina and the contraction of the pupils. See John V. Forrester et al., *The Eye* (WB Saunders Co. Ltd. 1996). This natural behavior of the human eye causes a problem in viewing anything other than the glare producing light source because the other visual information which is important to the observer is not detected as well by the eye. In the case where the observer is a driver of an automotive vehicle in the presence of glare produced by oncoming headlights or the sun at either dusk or dawn, the glare can cause "blindness". That is, the driver will observe the glare but the roadway and other conditions in the driver's view will appear black or darker even though these conditions are illuminated by the headlights of the driver's automobile. An analogous situation occurs in taking photographs with an automatic camera with a bright light source in the background. The camera adjusts the exposure based upon the bright light source resulting in a photograph that is underexposed with respect to the other visual information that is intended to be recorded. Devices which are intended to attenuate glare producing light reduce the intensity of the light from the glare producing light source in order to prevent the viewer's pupils from contracting thereby increasing the visibility of the other critical visual information.

Various types of devices for reducing glare are known in the art. Generally, most glare reduction devices use either tinted elements, polarized elements, or a combination of both tinted and polarized elements as a light filter to reduce the glare. Most of the glare reduction devices which rely completely on polarizing the light from oncoming headlights contemplate that the headlights of the approaching vehicle will be equipped with polarized elements such that the light emitted from the approaching vehicle is initially polarized. U.S. Pat. No. 2,087,795 to Chubb, U.S. Pat. No. 2,301,126 to Kriebel, U.S. Pat. No. 2,237,565 to Land, U.S. Pat. No. 2,334,446 to Serrell, U.S. Pat. No. 2,475,921 to Smith, and U.S. Pat. No. 3,026,763 to Marks. Glare reduction devices generally include windshields, visors, and eyeglasses equipped with light filters designed to reduce the glare.

U.S. Pat. No. 5,252,997 to Christenbery discloses a visual aid for night driving. The visual aid is a pair of glasses which includes a glare reduction arrangement 18. With reference to FIG. 1, the glare reduction arrangement 18 has a horizontal glare reduction portion 20 and a vertical glare reduction portion 22 located in the lower left hand quadrant as the wearer looks through the glasses. The intended purpose of the horizontal portion 20 is for the reduction of glare from oncoming headlights of automobiles. The vertical glare reduction portion 22 is provided to reduce the glare caused by headlights of automobiles approaching from the rear which are reflected by a driver's side mirror. The horizontal glare reducing portion is tinted and may be polarized, and the vertical glare reducing portion is preferably opaque, but may be polarized or tinted. The patent, however, does not disclose or suggest equipping eyeware with a glare reduction portion to account for the approach pattern of oncoming headlights.

U.S. Pat. No. 3,026,763 to Marks discloses a windshield which uses light polarization to eliminate the glare from oncoming headlights. The Marks technology requires that the oncoming headlights be equipped with structures to polarize light in the vertical plane. The windshield includes a multi-layered light polarizing structure extending across the top portion of the windshield and curved downwardly at both the left and right sides of the windshield. The polarization is graduated such that the polarization increases progressively from the bottom of the polarizing structure to the top.

U.S. Pat. No. 2,475,921 to Smith discloses a glare reduction filter utilizing polarized light for the reduction of the glare from oncoming headlights. The Smith arrangement requires that either the windshield or viewing visor include a polarizing element, and that the headlights of the oncoming vehicle be equipped with a light-polarizing headlight shield for cooperation with the polarizing element within the windshield or visor of the driver's automobile.

U.S. Pat. No. 2,301,126 to Kriebel discloses a glare elimination apparatus for reducing the glare from light sources originating from within an automotive vehicle. The apparatus uses two polarized elements for reducing the glare. The apparatus includes a transparent light-polarizing screen located behind the driver and goggles equipped with polarizing elements.

U.S. Pat. No. 2,237,565 to Land discloses an apparatus for use in antiglare devices employing polarized light. The Land apparatus is intended to improve antiglare devices which require polarized light elements in both the headlights of the oncoming automotive vehicles and the windshields or visors of the vehicle. The improvement addresses a problem created by the inclusion of plastic sheets in a windshield to make them shatter-proof by adding a third polarizing element to correct distortion caused by the plastic sheets.

U.S. Pat. No. 2,087,795 to Chubb discloses a vehicle lighting system for reducing the glare from oncoming headlights. The lighting system contemplates that all automobiles will be equipped with polarized headlights and that the drivers of their respective automobiles will wear goggles that include polarized elements to reduce or eliminate the oncoming headlight glare. The polarized elements are located in the upper portion of the goggles in the belief that the driver will instinctively use the polarized portion of the goggles in the presence of oncoming headlights. The Chubb '795 patent also discloses that as an alternative to the polarized light, colored light and goggles with colored elements could similarly be used. Chubb indicates that the windshield could also include polarizing elements in lieu of goggles.

U.S. Pat. No. 1,577,527 to Hoyt discloses a tinted windshield for reducing the glare from oncoming headlights.

U.S. Pat. No. 2,334,446 to Serrell discloses polarizing goggles for reducing headlight glare and road glare during daytime driving. The upper segment of goggle lenses include a polarized element intended to cooperate with polarizing devices included in the headlights of the oncoming automotive vehicles. The lower segment of the goggle lenses include a polarized element intended to reduce the glare from road surfaces during daytime driving.

U.S. Pat. No. 2,773,422 to Flynn et al. discloses sunglasses which include a plurality of polarized elements. The sunglasses are configured to allow polarized elements to be rotated with respect to each other for regulating the passage of light through the glasses.

U.S. Pat. No. 2,005,426 to Land discloses polarizing sunglasses which include two polarized elements for each eye. The sunglasses are configured to allow the two polarized elements to be rotated with respect to each other to adjust the amount of light that may pass through the lenses.

U.S. Pat. No. 1,584,041 to Shaver discloses an eye shield for protecting the eyes of a driver of an automobile from the glare of oncoming headlights. The eye shield includes lenses having a tinted portion which are capable of being rotated within the frames so that the tinted portion may be positioned at either the bottom or the top of the frame.

U.S. Pat. No. 950,255 to Alles discloses and eye shade for protecting the eyes of workman in the metal and glass working trades. The eye shade includes a translucent portion at the upper portion of the glasses.

U.S. Pat. No. 5,372,504 to Buechler discloses clip-on eyewear for pilot training which has an opaque region on each lens.

U.S. Pat. No. 4,698,022 to Gilson discloses goggles for pilot training which include a region having a translucency selected for varying visibility distances.

Each of the methods and apparatus described above has inherent shortcomings which detract from convenience of use and/or efficacy of attenuating glare without diminishing visual information, and it is an object of the present invention to overcome such shortcomings and to provide an improved method and apparatus for restricting glare while minimizing loss of visual information.

SUMMARY OF THE INVENTION

The present invention is a method and apparatus for reducing glare. The method employs various embodiments of the invention to reduce glare under various circumstances. These circumstances include driving in the presence of a glare producing light source, watching television in a brightly lit room, watching television while also reading in a brightly lit room, and observing an object (e.g., a ball) in athletic competition while encountering a bright glare producing light source.

The method of the invention relating to glare reduction for a driver of a vehicle includes filtering light as seen by the driver in a region of a windshield. The region is defined by the perimeter of the windshield on the driver's side and a separatrix, which includes a horizontal segment, a vertical segment, and a perspective segment. The horizontal segment is located between a driver's side portion and a passenger's side portion of the perimeter of the windshield and has first and second ends such that the second end is adjacent to the driver's side portion and the first end is adjacent to the passenger's side portion. The vertical segment begins at a central position on an upper portion of the perimeter of the windshield and terminates at the first end of the horizontal segment. The perspective segment begins at the second end of the horizontal segment and extends downward at an obtuse angle towards the driver's side portion of the windshield terminating at a lower portion of the perimeter of the windshield. The obtuse angle is about 95 to about 135 degrees and is preferably in a range from about 115 to about 130 degrees.

The apparatus of the invention for reducing glare when driving includes a light filter having a region as described above with respect to the method of the invention. The light filter uses either tinted elements, polarized elements, or a combination of both tinted and polarized elements for reducing the intensity of the light emitted by the light source. The light filter can be positioned between the driver and the light source in various ways, e.g., supported by a support frame attached to the driver, supported by the vehicle, or a combination of both, and still be part of the present invention. Embodiments of the light filter which use the support frame include eyeglasses and clip-on eyeware. Embodiments of the light filter that are supported by the vehicle include windshields and visors. These and other embodiments of the invention will be described in more detail below.

In a preferred embodiment of the invention the light filter includes a pair of light filter elements that are supported by a support frame in front of the driver's eyes. Each light filter element includes a horizontal extending portion and a substantially triangular portion. The horizontal extending portion has a lower boundary which is substantially parallel with the horizon. The substantially triangular portion has a perspective boundary and is disposed in a lower quadrant corresponding to the approach pattern of oncoming headlights. The perspective boundary and lower boundary form an obtuse angle and define a vertex.

Preferably, the lower boundary of the horizontal portion is located a vertical distance approximately $25/64$ inch (1 cm.) above the driver's line of sight. The vertex is preferably horizontally displaced a distance from the driver's line of sight such that the vertex is located between the approach pattern of oncoming headlights and the driver's line of sight. Preferably, the horizontal portion can be configured to extend across the entire visual field of the driver which is useful when driving towards the sun at either dusk or dawn.

In another preferred embodiment of the invention, the light filter includes a first polarized element, a second polarized element, and a support frame. The first polarized element is adapted to be supported by the vehicle in a position between the driver and the light source and has a region as described above with respect to the method of the invention. Preferably, the first polarized element is incorporated into the windshield of the automotive vehicle or is in the form of a visor which is configured to either adhere to the windshield or be mechanically fastened to the automotive vehicle. The second polarized element cooperates with respect to the first polarized element to reduce the intensity of the light as seen by the driver. The second polarized element is supported by a support frame in front of the driver's eyes. Preferably, the second polarized element is rotationally adjustable with respect to the first polarized element allowing for the adjustment of the intensity of the light as seen by the driver. The support frame can include handholds which aid the driver in rotating the second polarized element with respect to the first polarized element. In an alternative embodiment of the invention, both the first polarized element and the second polarized element are supported in the support frame. In this embodiment the first polarized element remains fixed while the second polarized element is rotationally adjustable.

When a person uses any of the glare reduction devices described above, the user can and will adjust the visual field to suit the particular person's needs by adjusting the line of sight through head and eye movements.

As a result of the present invention, a method and apparatus for attenuating unwanted additional light in a person's field of vision is provided. Advantage of the light filter is that all the embodiments take into account the approach pattern of the glare producing automotive vehicles.

Another advantage of the light filter is that the filter reduces the glare producing blinding light while allowing the driver to continue receiving visual information regarding oncoming vehicles. Further, the embodiments that use rotationally adjustable polarized elements allow the driver to adjust the light filter to alter the transmissivity of the light filter to suit a variety of road conditions. More importantly, the present invention does not require the headlights of the oncoming vehicles to be equipped with polarizing structures to operate as required by the prior art.

For a better understanding of the present invention, reference is made to the following description to be taken in conjunction with the accompanying drawings and its scope will be pointed out in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

Figure 1:
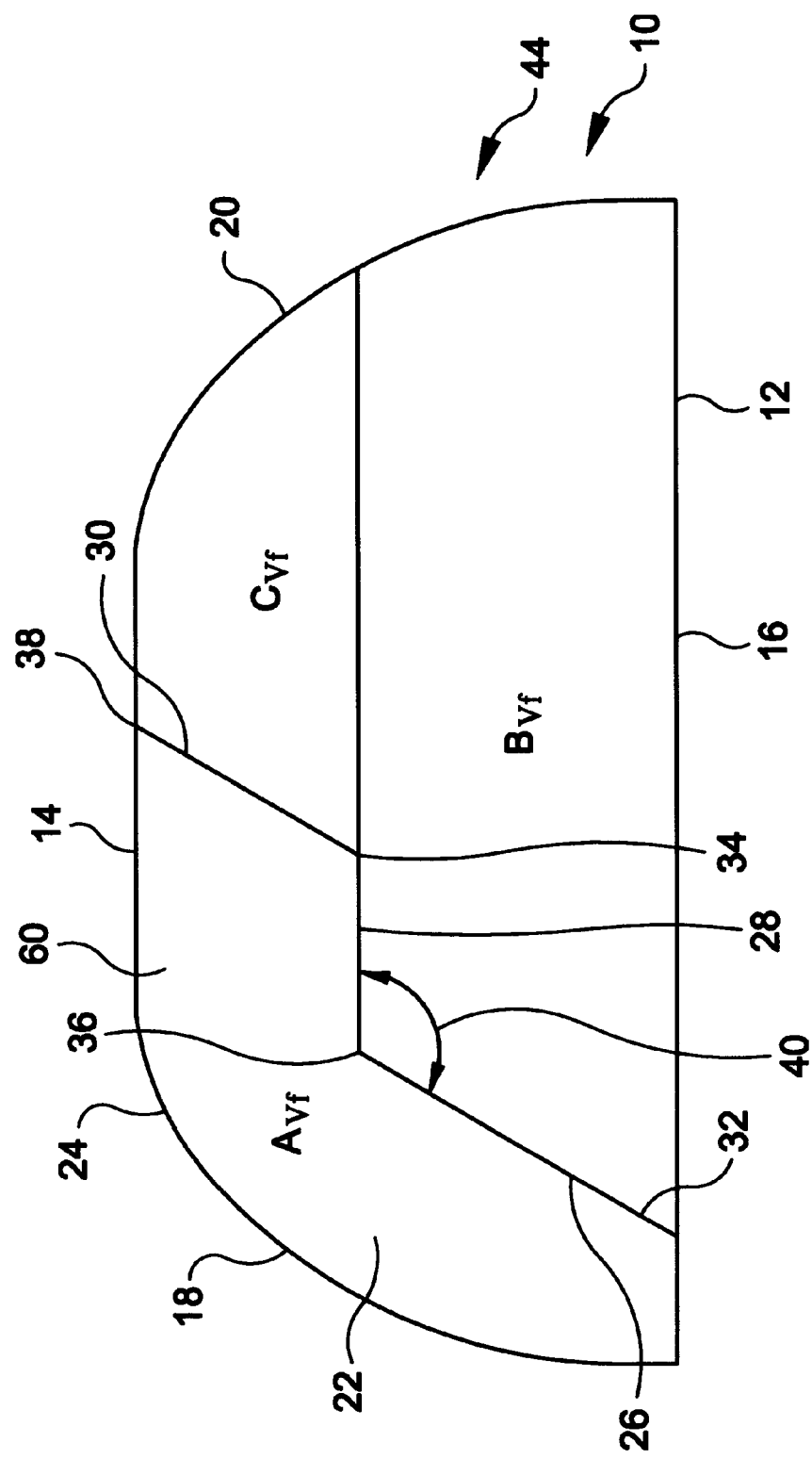
FIG. 1 is a view through a windshield of an automotive vehicle segmented into three separate visual fields designated as $A_{vf}$, $B_{vf}$, and $C_{vf}$.

The method of the invention related to reducing glare when driving is described with reference to FIG. 1. FIG. 1 illustrates a view looking through a windshield 10 of an automotive vehicle from within the vehicle. The view through the windshield 10 is defined by a perimeter 12 having an upper portion 14, a lower portion 16, a driver's side portion 18, and a passenger's side portion 20. The view is shown segmented into three separate visual fields designated as $A_{vf}$, $B_{vf}$, and $C_{vf}$. Visual field $A_{vf}$ designates a region 22 of a driver's view which has been found to be most adversely affected by glare created by headlights of oncoming automotive vehicles. Visual field $B_{vf}$ designates an area of the driver's view through which the most useful visual information is obtained by a driver when encountering headlight glare. Visual field $C_{vf}$ designates an area of a driver's view which has been found to be also adversely affected by glare created by the sun at either dusk or dawn. Visual fields $A_{vf}$, $B_{vf}$, and $C_{vf}$ have been shown for countries such as the United States where persons drive on the right hand side of the road. In countries such as England where persons drive on the left hand side of the road, the visual fields $A_{vf}$, $B_{vf}$, and $C_{vf}$ would be a mirror image to that which is shown in FIG. 1.

The method uses a light filter 24, to reduce the intensity of light encountered by a driver from the light source in the region 22 designated by visual field $A_{vf}$. The region 22 is defined by a portion of the perimeter 12 of the windshield 10 including the driver's side portion 18 and a separatrix 26. The separatrix 26 includes a horizontal segment 28, a vertical segment 30, and a perspective segment 32. The horizontal segment 28 is located between the driver's side portion 18 and the passenger's side portion 20 of the windshield 10 and has first and second ends 34, 36. The second end 36 is adjacent to the driver's side portion 18 and the first end 34 is adjacent to the passenger's side portion 20. The vertical segment 30 begins at a central position 38 on the upper portion 14 of the windshield 10 and ends at the first end 34 of the horizontal segment 28. The perspective segment 32 begins at the second end 36 of the horizontal segment 28 and extends downward at an obtuse angle 40 towards the driver's side portion 18 and 10 ending at the lower portion 16 of the windshield 10. The perspective segment 32 accounts for the approach pattern of oncoming automobiles. Preferably, the horizontal segment 28 is arranged substantially parallel with the horizon. The obtuse angle 40 is about 95 to about 135 degrees and is preferably in a range from about 115 to about 130 degrees. The perspective segment 32 is preferably selected so that when viewed by the driver it is aligned with a line located in the horizon that runs substantially parallel with the center of the roadway upon which the driver is driving. The light filter 24 is positioned between the driver and the light source to reduce the intensity of light in visual field $A_{vf}$.

Figure 2:
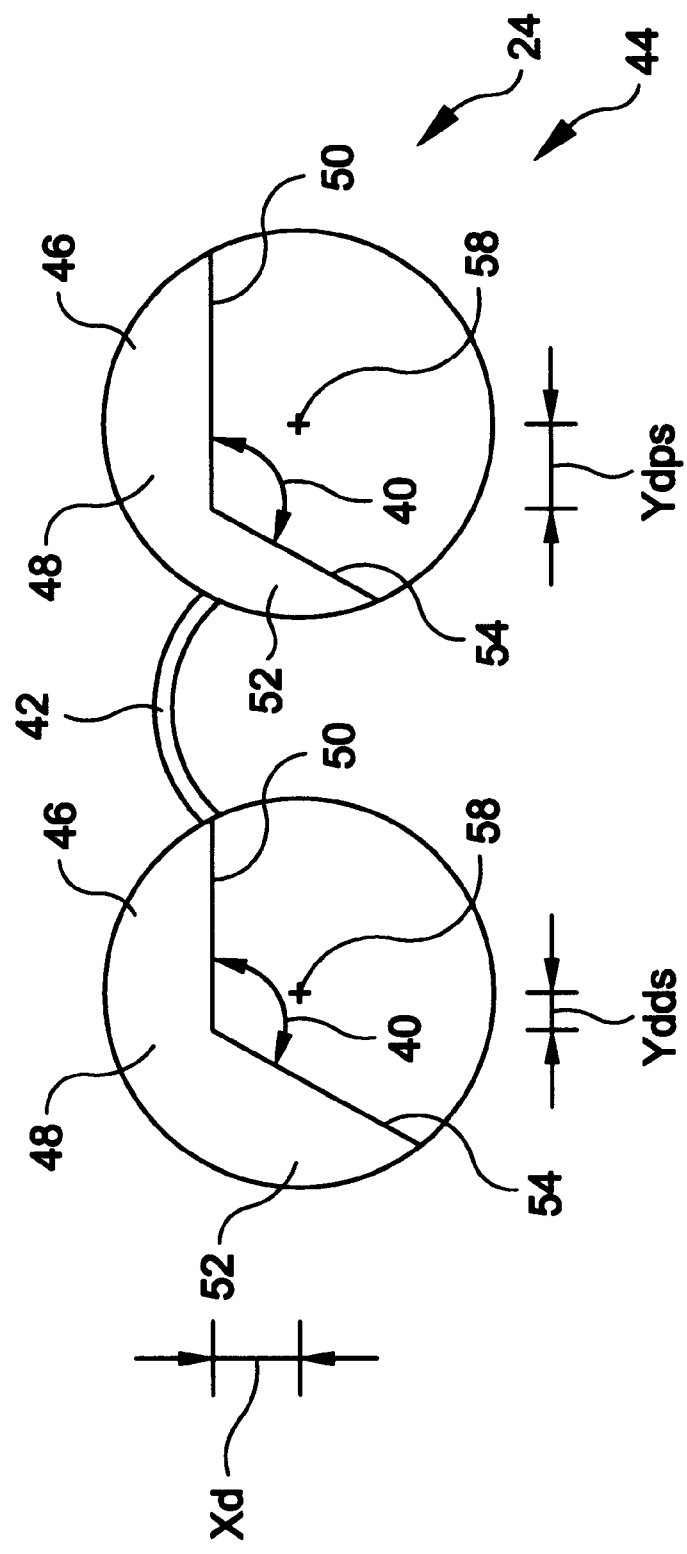
FIG. 2 is an elevational view of one embodiment of the present invention for reducing glare while driving an automotive vehicle.
Figure 3:
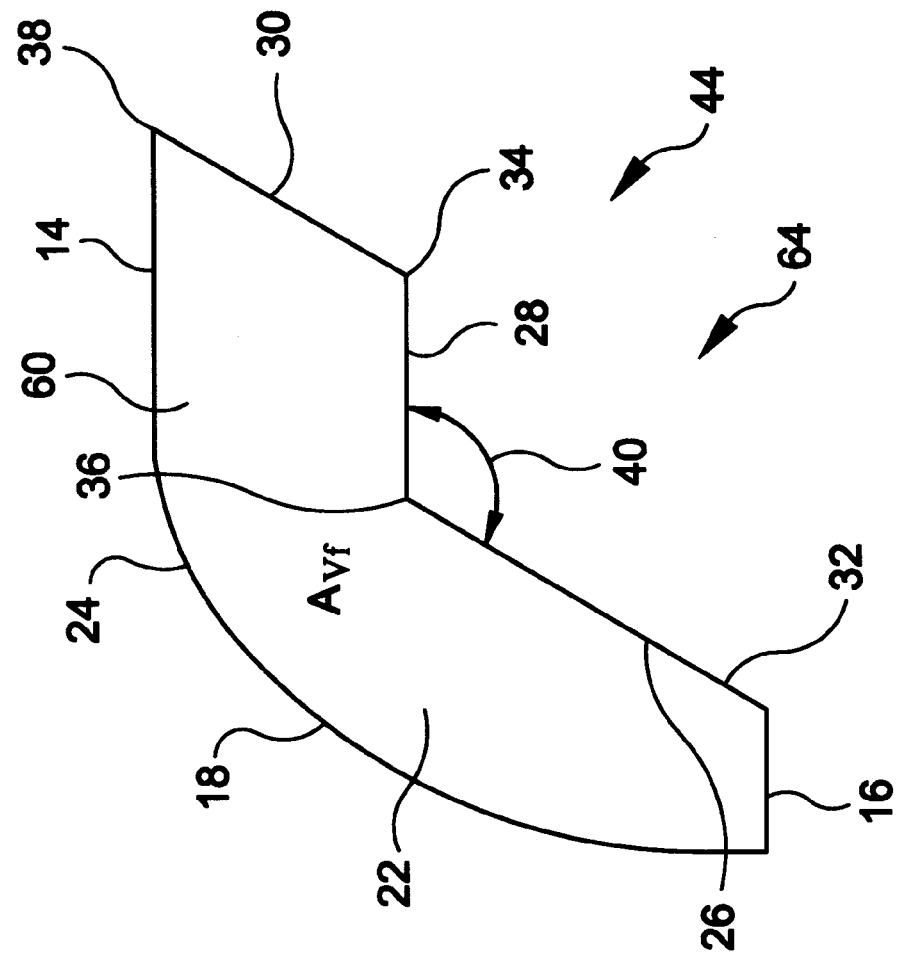
FIG. 3 is an elevational view of a visor which is another embodiment of the present invention.

Generally, the light filter 24 uses either tinted elements, polarized elements, or a combination of both tinted and polarized elements for reducing the intensity of the light emitted by the light source. The light filter 24 can be positioned between the driver and the light source in various way, e.g., supported by a support frame 42 attached to the driver, supported by the vehicle, or a combination of both. Embodiments of the light filter 24 which use the support frame 42 include eyeglasses and clip-on eyeware as shown in FIG. 2. Embodiments of the light filter 24 that are supported by the automotive vehicle include windshields and visors as shown in FIGS. 1 and 3. These and other embodiments of the invention will be described in more detail below.

Referring again to FIG. 1, the reduction of the light's intensity in the region 22 designated by visual field $A_{vf}$ allows a driver to see better when encountering oncoming headlights. Visual field $A_{vf}$ corresponds to the portion of a driver's view that is most affected by the intensity of oncoming headlights. Ordinarily, if the intensity of the light is not reduced, the light will reduce a driver's visual acuity thereby reducing the visual information received from the remainder of a roadway, which generally corresponds to visual field $B_{vf}$ in FIG. 1. The visual information that is derived from visual field $B_{vf}$ is generally the most critical to the driver. When the intensity of the light is reduced in visual field $A_{vf}$ the driver's visual acuity is not degraded allowing the driver to see the visual information corresponding to visual field $B_{vf}$ better. During daytime driving, the light filter 24 reduces road glare from the sun to also improve the driver's visibility.

In an embodiment of the invention the windshield 10 has a light filter 24 that corresponds to visual field $A_{vf}$. The light filter 24 can use an element which is either tinted, polarized, or both tinted and polarized.

A preferred embodiment of the glare reduction device 44 is shown in FIG. 2. FIG. 2 depicts an elevational view looking through the glare reduction device for countries where persons drive on the right hand side of the road. The glare reduction device 44 includes a pair of light filter elements 46 and a support frame 42. Each light filter element 46 includes a horizontal extending portion 48 and a substantially triangular portion 52. The horizontal extending portion 48 has a lower boundary 50 which is substantially parallel with the horizon. The substantially triangular portion 52 has a perspective boundary 54 which is disposed in a lower quadrant corresponding to the approach pattern of oncoming headlights, and is selected in a similar manner as the perspective segment 32 as described above with reference to the method of the invention. The perspective boundary 54 and lower boundary 50 form an obtuse angle 40 and define a vertex 56. The support frame 42 supports the pair of light filter elements 46 in front of the driver's eyes.

The support frame 42 can include standard eyeglass frames, clip-on style eyeware frames, or other structures adapted to attach to the driver while supporting the pair of light filter elements 46. An example of standard eyeglass frames is shown in U.S. Pat. No. 5,252,997 to Christenbery the disclosure of which is incorporated herein by reference. Suitable clip-on style eyeware frames are manufactured by Foster Grant Co. and are shown as an example in U.S. Pat. No. 5,372,504 to Buechler the disclosure of which is incorporated herein by reference. The light filter elements 46 are either tinted, polarized, or both tinted and polarized for reducing the intensity of the light emitted by the light source. The light filter elements 46 can also be incorporated within a driver's prescription eyeglasses.

The obtuse angle 40 is about 95 to about 135 degrees and is preferably in a range from about 115 to about 130 degrees. Preferably, the lower boundary 50 of the horizontal portion 48 is located a vertical distance $X_d$ approximately 25/64 inch (1 cm.) above the driver's line of sight 58. The vertex 56 is horizontally displaced a distance away from the driver's line of sight 58 such that the vertex 56 is located between the approach pattern of oncoming headlights and the driver's line of sight 58 designated by a cross +in FIG. 2. The distance is selected for each of the light filter elements 46 to account for parallax so that the perspective boundary 54 of each light filter element 46 is aligned with a line located in the horizon that runs parallel with the center of the roadway upon which the driver is driving. Accordingly, a first distance $Y_{dds}$ for the light filter element 46 that is adjacent to the driver's side is less than a second distance $Y_{dps}$ for the light filter element 46 that is adjacent to the passenger's side of the automotive vehicle. In FIG. 2, $Y_{dds}$ and $Y_{dps}$ correspond to the distance for the light filter element 46 of the left and right eyes respectively. In countries where persons drive on the left hand side of the road, the opposite is true. With reference to FIGS. 1 and 2, the horizontal portion 48 can be configured to extend into the driver's visual field $C_{vf}$. This latter feature is particularly useful when driving towards the sun at either dusk or dawn.

Figure 4:
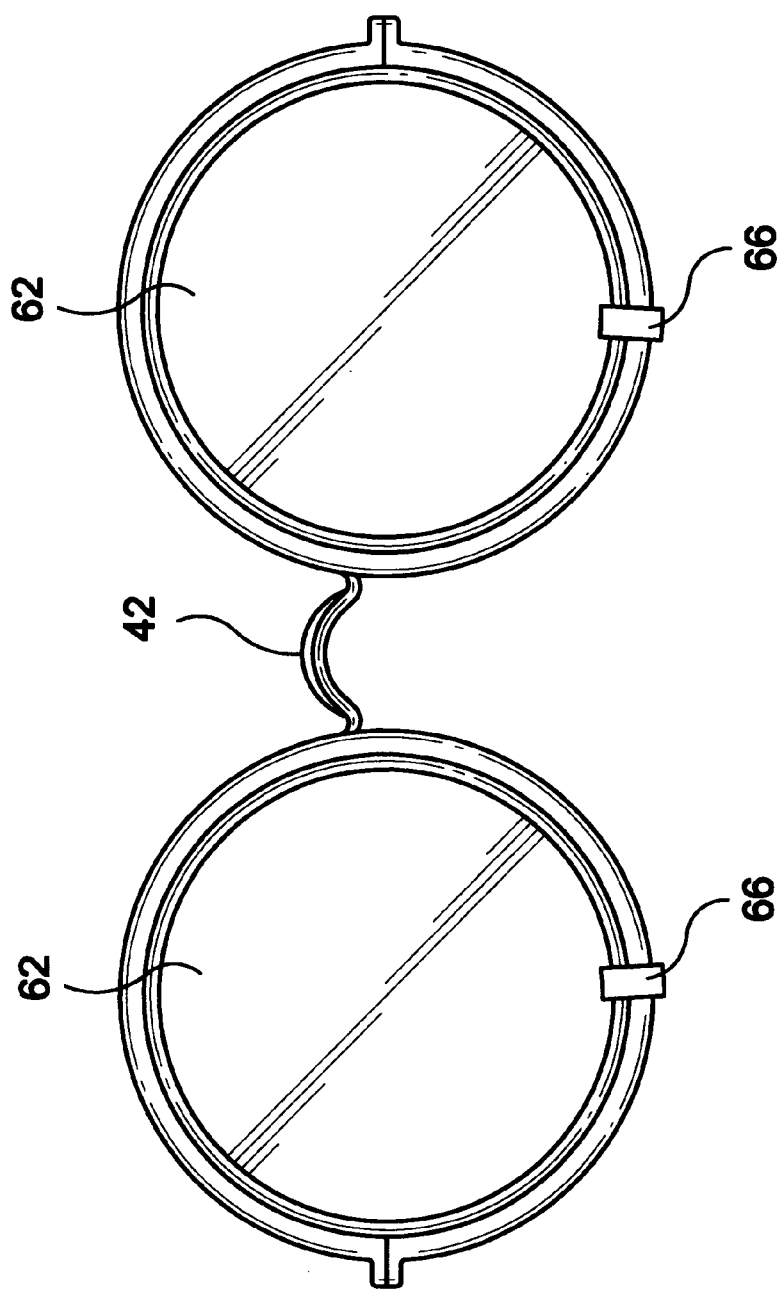
FIG. 4 is an elevational view of a support frame which supports a second polarized element in another embodiment of the present invention for use in conjunction with either the windshield shown in FIG. 1 or the visor shown in FIG. 3.

Referring now to FIGS. 1, 3 and 4, in another preferred embodiment of the invention, the glare reduction device 44 includes a first polarized element 60, a second polarized element 62, and a support frame 42. This embodiment of the invention utilizes a principle in physics that when two polarized elements are arranged such that a light source is viewed through both polarized elements where θ is the angle between the polarizing directions of the first polarized element 60 and the second polarized element 62 and $I_m$ is the maximum value of transmitted intensity, the intensity of the light I', transmitted varies with θ according to: $I_t = I_m \cos^2 \theta$. That is, where the second polarized element 62 is oriented at an angle in the range of 40° to 80° with respect to the first polarized element 60 a respective reduction in the range of 41% to 97% of the incoming light's intensity will result.

Referring now to FIGS. 1 and 3, the first polarized element 60 has a region 22 and is adapted to be supported by the automotive vehicle in a position between the driver and the light source. The region 22 coincides with visual field $A_{vf}$ which is described above with respect to the method of the invention. In a preferred embodiment, the first polarized element 60 is incorporated into the windshield of the automotive vehicle as shown in FIG. 1. The first polarized element 60 can also be in the form of a visor 64 as shown in FIG. 3. The visor 64 can be configured to either adhere to the windshield or be mechanically fastened to the vehicle.

Referring now to FIG. 4, the second polarized element 62 cooperates with the first polarized element 60 as described above to reduce the intensity of the light as seen by the driver. The second polarized element 62 is supported by a support frame 42 in front of the driver's eyes. Preferably, the second polarized element 62 is rotationally adjustable with respect to the first polarized element 60 which allows the driver to adjust the intensity of the light. A support frame 42 suitable for this purpose is shown in FIG. 4 which is adopted from U.S. Pat. No. 1,584,041 to Shaver, the disclosure of which is incorporated herein by reference. As shown in FIG. 4, the support frame 42 preferably includes handholds 66 which aid the driver in rotating the second polarized element 62 with respect to the first polarized element 60.

Figure 5:
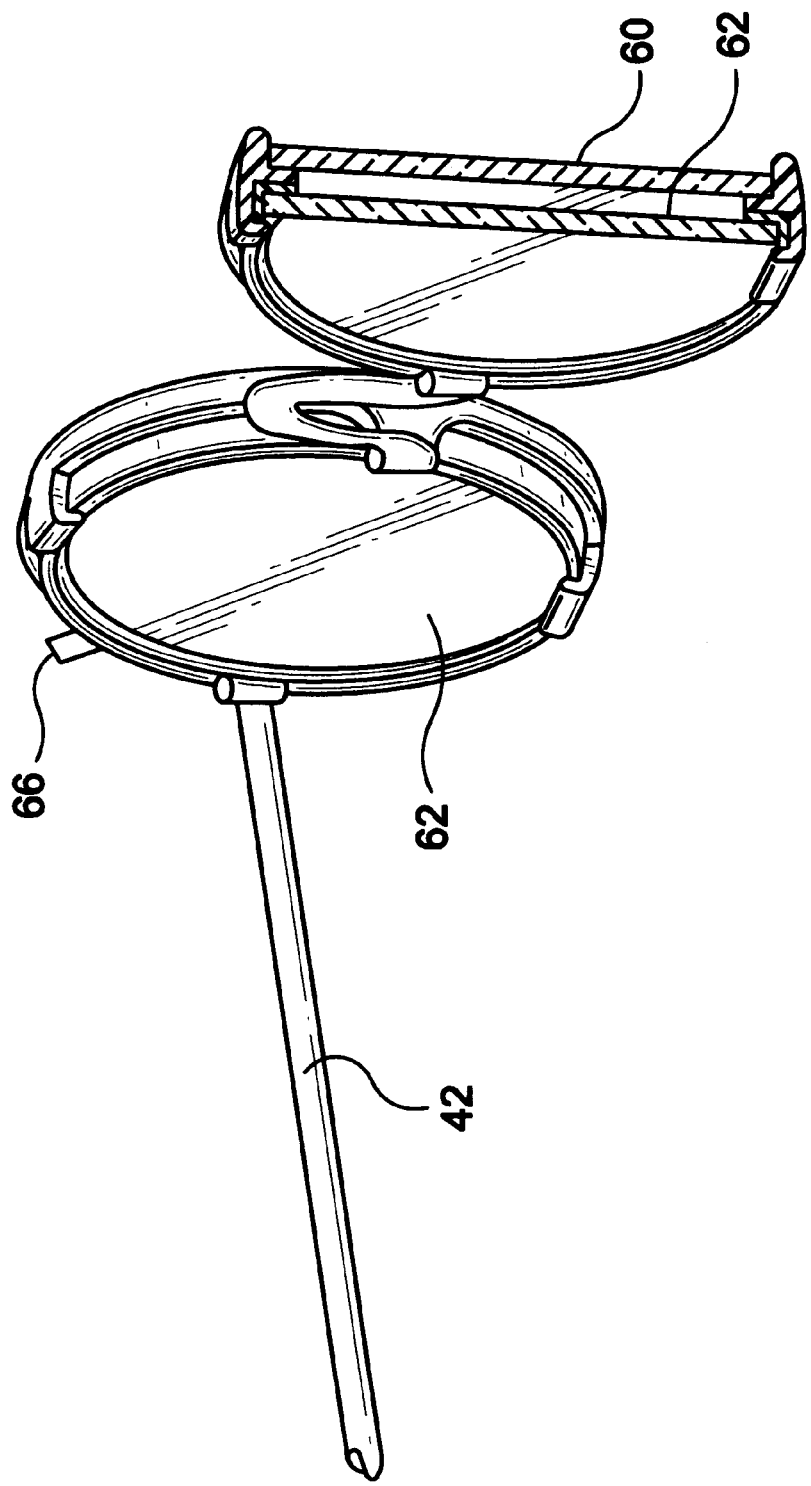
FIG. 5 is a view partly in perspective and partly in section showing an embodiment of the present invention where the support frame supports both the first and second polarized elements.

Referring now to FIG. 5, in an alternative embodiment of the invention which includes a first polarized element 60, a second polarized element 62, and a support frame 42, both the first polarized element 60 and the second polarized element 62 are supported in the support frame 42. A support frame 42 suitable for this purpose is shown in FIG. 5 which is adopted from U.S. Pat. No. 2,005,426 to Land, the disclosure of which is incorporated herein by reference. In this embodiment the first polarized element 60 remains fixed and defines the region 22 corresponding to visual field $A_{vf}$ in the same manner as illustrated in FIG. 2. The second polarized element 62 is capable of being rotated to adjust the transmission of light. Handholds 66 have been added to the support frame 42 for ease in adjusting the orientation of the second polarized element 62 with respect to the first polarized element 60. The support frame 42 as shown in FIG. 5 allows for a 90° range in the rotation of the second polarized element 62.

When a person uses any of the glare reduction devices described above, the invention contemplates that the user can and will adjust the visual field to suit the particular person's needs by adjusting their line of sight through head and eye movements.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What is claimed is:

1. A glare reduction device for use by a driver of an automotive vehicle for encountering a light source that emits light having an intensity, the automotive vehicle including a windshield defined by a perimeter having an upper portion, a lower portion, a driver's side portion, and a passenger's side portion, said glare reduction device comprising:

a light filter supported by the automotive vehicle and positioned between the driver and the light source, said light filter being configured to reduce the intensity of the light emitted by the light source as seen by the driver through the windshield in a region, said region being defined by a portion of the perimeter of the windshield including the driver's side portion and a separatrix, said separatrix including:

a horizontal segment being located between the driver's side portion and the passenger's side portion of the perimeter of the windshield and having first and second ends such that said second end is adjacent to the driver's side portion and said first end is adjacent to the passenger's side portion;

a vertical segment beginning at a central position on the upper portion of the perimeter of the windshield and ending at said first end of said horizontal segment; and a perspective segment beginning at said second end of said horizontal segment extending downward at an obtuse angle towards the driver's side portion of the perimeter of the windshield and ending at the lower portion of the perimeter of the windshield.

2. A glare reduction device as defined in claim 1 wherein said horizontal segment is adapted to be substantially parallel with a horizon.

3. A glare reduction device as defined in claim 1 wherein said obtuse angle is about 95 to about 135 degrees.

4. A glare reduction device as defined in claim 3 wherein said obtuse angle is about 115 to about 130 degrees.

5. A glare reduction device as defined in claim 1 wherein said light filter includes a tinted element for reducing the intensity of the light emitted by the light source.

6. A glare reduction device as defined in claim 1 wherein said light filter includes a polarized element for reducing the intensity of the light emitted by the light source.

7. A glare reduction device as defined in claim 1 wherein said light filter includes a first polarized element that substantially defines said region of said light filter; and a second polarized element that cooperates and is rotationally adjustable with respect to said first polarized element, whereby the intensity of the light as seen by the driver can be adjusted by rotating said second polarized element.

8. A glare reduction device for use by a driver of an automotive vehicle having a driver's side and a passenger's side for encountering a light source that emits light having an intensity that accounts for an approach pattern of oncoming headlights from automobiles, said glare reduction device comprising:

a pair of light filter elements with each of said light filter elements including:

a horizontal extending portion having a lower boundary that is substantially parallel with a horizon; and a substantially triangular portion having a perspective boundary and being disposed in a lower quadrant corresponding to the approach pattern of oncoming headlights, said perspective boundary and said lower boundary forming an obtuse angle and defining a vertex;

said vertex of said light filter element adjacent the driver's side of the automotive vehicle adapted to be horizontally displaced a first distance away from the driver's line of sight such that said vertex is located between the approach pattern of oncoming headlights and the driver's line of sight;

said vertex of said light filter element adjacent the passenger's side of the automotive vehicle adapted to be horizontally displaced a second distance away from the driver's line of sight such that said vertex is located between the approach pattern of oncoming headlights and the driver's line of sight; and said first distance being less than said second distance, and a support frame for supporting said pair of light filter elements in front of the driver's eyes, whereby said pair of light filter elements reduce the intensity of the light emitted by the light source as seen by the driver.

9. A glare reduction device as defined in claim 8 wherein said obtuse angle is about 95 to about 135 degrees.

10. A glare reduction device as defined in claim 9 wherein said obtuse angle is about 115 to about 130 degrees.

11. A glare reduction device as defined in claim 8 wherein said lower boundary is adapted to be about $25/64$ inch (1 cm.) above the driver's line of sight.

12. A glare reduction device as defined in claim 8 wherein each of said pair of eye light filter elements are tinted for reducing the intensity of the light emitted by the light source.

13. A glare reduction device as defined in claim 8 wherein each of said pair of eye light filter elements are polarized for reducing the intensity of the light emitted by the light source.

14. A glare reduction combination for use by a driver of an automotive vehicle for encountering a light source that emits light having an intensity that accounts for an approach pattern of oncoming headlights from automobiles, the automotive vehicle including a windshield defined by a perimeter having an upper portion, a lower portion, a driver's side portion, and a passenger's side portion, said glare reduction combination comprising:

a first polarized element having a region and supported by the automotive vehicle in a position between the driver and the light source, said region being defined by a portion of the perimeter of the windshield including the driver's side portion and a separatrix, said separatrix including:

a horizontal segment being located between the driver's side portion and the passenger's side portion of the perimeter of the windshield and having first and second ends such that said second end is adjacent to the driver's side portion and said first end is adjacent to the passenger's side portion;

a vertical segment beginning at a central position on the upper portion of the perimeter of the windshield and ending at said first end of said horizontal segment; and a perspective segment beginning at said second end of said horizontal segment extending downward at an obtuse angle towards the driver's side portion of the perimeter of the windshield and ending at the lower portion of the perimeter of the windshield;

a second polarized element that cooperates with respect to said first polarized element; and a support frame for supporting said second polarized element in front of the driver's eyes, whereby said first and second polarized elements in combination reduce the intensity of the light as seen by the driver.

15. A glare reduction combination as defined in claim 14 wherein said horizontal segment is adapted to be substantially parallel with a horizon.

16. A glare reduction combination as defined in claim 14 wherein said obtuse angle is about 95 to about 135 degrees.

17. A glare reduction combination as defined in claim 14 wherein said obtuse angle is about 115 to about 130 degrees.

18. A glare reduction combination as defined in claim 14 wherein said second polarized element is rotationally adjustable with respect to said first polarized element whereby the intensity of the light as seen by the driver can be adjusted by rotating said second polarized element.

19. A glare reduction device for use by a driver of an automotive vehicle for encountering a light source that emits light having an intensity, said glare reduction device comprising:

a windshield defined by a perimeter having an upper portion, a lower portion, a driver's side portion, and a passenger's side portion and having a light filter, said light filter being configured to reduce the intensity of the light emitted by the light source as seen by the driver through said windshield in a region, said region being defined by a portion of said perimeter of said windshield including the driver's side portion and a separatrix, said separatrix including:

a horizontal segment being located between said driver's side portion and said passenger's side portion of said perimeter of said windshield and having first and second ends such that said second end is adjacent to said driver's side portion and said first end is adjacent to said passenger's side portion;

a vertical segment beginning at a central position on said upper portion of said perimeter of said windshield and ending at said first end of said horizontal segment; and a perspective segment beginning at said second end of said horizontal segment extending downward at an obtuse angle towards said driver's side portion of said perimeter of said windshield and ending at said lower portion of said perimeter of said windshield.

* * * * *